US010144506B2

(12) United States Patent
Didey et al.

(10) Patent No.: US 10,144,506 B2
(45) Date of Patent: Dec. 4, 2018

(54) DRIVE SYSTEM FOR AIRCRAFT LANDING GEAR (71) Applicant: AIRBUS OPERATIONS LIMITED, Bristol (GB)

(72) Inventors: Arnaud Didey, Bristol (GB); Fraser Wilson, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 257 days.

(21) Appl. No.: 15/126,806

(22) PCT Filed: Mar. 16, 2015

(86) PCT No.: PCT/GB2015/050753
§ 371 (c)(1),
(2) Date: Sep. 16, 2016

(87) PCT Pub. No.: WO2015/140520
PCT Pub. Date: Sep. 24, 2015

(65) Prior Publication Data
US 2017/0137119 A1 May 18, 2017

(30) Foreign Application Priority Data
Mar. 17, 2014 (GB) .................................. 1404704.7

(51) Int. Cl.
B64C 25/50 (2006.01)
B64C 25/40 (2006.01)
(Continued)

(52) U.S. Cl.
CPC .......... B64C 25/405 (2013.01); F16F 15/073 (2013.01); F16F 15/161 (2013.01);
(Continued)

(58) Field of Classification Search
CPC ................................................... B64C 25/405
See application file for complete search history.

(56) References Cited

U.S. PATENT DOCUMENTS 2,812,648 A * 11/1957 Croset ...................... F16D 3/80
464/24
2,841,000 A * 7/1958 Parks ......................... F16D 3/62
464/77
(Continued)

FOREIGN PATENT DOCUMENTS

EP 0312710 A2 4/1989
EP 2524816 A1 11/2012
(Continued)

OTHER PUBLICATIONS

Hiroshi Honda and Hiroshi Makino, "Research on the Trochoidal Gears (1st Report): Classification and Basic Formulas of the Trochoidal Gears". Translation of Journal of the Japan Society for Precision Engineering, 1994, vol. 60, No. 7, p. 949-953.
(Continued)

Primary Examiner — Richard G Davis
(74) Attorney, Agent, or Firm — Nixon & Vanderhye P.C.

(57) ABSTRACT

A drive system for rotating a wheel of an aircraft landing gear. The drive system has a drive pinion and a motor operable to rotate the drive pinion via a drive path. A rotary damper is provided in the drive path between the motor and the drive pinion. A driven gear is adapted to be attached to the wheel so as to be capable of rotating the wheel. The drive system has a drive configuration in which the drive pinion is capable of meshing with the driven gear to permit the motor to drive the driven gear via the drive path. One of the drive pinion and the driven gear comprises a roller gear having a series of rollers arranged to form a ring, each roller being (Continued)

rotatable about a roller axis, and the other of the drive pinion and the driven gear comprises a sprocket.

16 Claims, 7 Drawing Sheets (51) Int. Cl.
*F16F 15/16* (2006.01)
*F16F 15/073* (2006.01)
*F16H 1/24* (2006.01)
*F16H 57/00* (2012.01)
*F16H 57/04* (2010.01)
*F16H 55/10* (2006.01)
*F16H 57/02* (2012.01)

(52) U.S. Cl.
CPC .......... *F16F 15/162* (2013.01); *F16F 15/163* (2013.01); *F16H 1/24* (2013.01); *F16H 57/0006* (2013.01); *F16H 57/042* (2013.01); *F16H 57/0404* (2013.01); *F16H 57/0417* (2013.01); *F16H 57/0436* (2013.01); *F16H 55/10* (2013.01); *F16H 2057/02034* (2013.01); *F16H 2057/02043* (2013.01); *Y02T 50/823* (2013.01)

(56) References Cited

U.S. PATENT DOCUMENTS

| | | | | |
|---|---|---|---|---|
| 4,411,341 A | * | 10/1983 | Schultz | F16F 9/145 16/57 |
| 4,947,707 A | * | 8/1990 | Koenneker | F16H 55/18 464/68.1 |
| 2006/0196287 A1 | * | 9/2006 | Walters | F16D 3/62 74/411 |
| 2012/0305702 A1 | * | 12/2012 | Bucheton | F16D 3/62 244/101 |
| 2013/0200210 A1 | * | 8/2013 | Oswald | B64C 25/405 244/50 |
| 2014/0158820 A1 | | 6/2014 | Wilson et al. | |
| 2014/0187370 A1 | * | 7/2014 | Walsh | F16H 7/0827 474/121 |
| 2014/0225421 A1 | * | 8/2014 | Oswald | B64C 25/405 301/6.2 |
| 2014/0245853 A1 | | 9/2014 | Didey | |
| 2014/0353423 A1 | * | 12/2014 | Himmelmann | B64C 25/405 244/50 |
| 2015/0210384 A1 | * | 7/2015 | Geck | B64C 25/405 244/50 |
| 2015/0210385 A1 | | 7/2015 | Didey | |

FOREIGN PATENT DOCUMENTS

| | | |
|---|---|---|
| GB | 2398619 A | 8/2004 |
| WO | 0146605 A1 | 6/2001 |
| WO | 2011023505 A2 | 3/2011 |
| WO | 2014023939 A1 | 2/2014 |
| WO | 2014023941 A1 | 2/2014 |

OTHER PUBLICATIONS

Hiroshi Honda, "Research on the Trochoidal Gears (2nd Report): Pressure Angle of Trochoidal Gears and Modification of Tooth Profile". Translation of Journal of the Japan Society for Precision Engineering, 1995, vol. 61, No. 2, p. 208-212.
International Search Report and Written Opinion of the ISA dated Jun. 10, 2015 International Application No. PCT/GB2015/050753.

* cited by examiner

DRIVE SYSTEM FOR AIRCRAFT LANDING GEAR

RELATED APPLICATIONS

The present application is a National Phase of International Application Number PCT/GB2015/050753, filed Mar. 16, 2015, which claims priority from Great Britain Application Number 1404704.7, filed Mar. 17, 2014.

FIELD OF THE INVENTION

The present invention relates to a drive system for rotating a wheel of an aircraft landing gear.

BACKGROUND OF THE INVENTION

A drive system for rotating a wheel of an aircraft landing gear is shown in WO-A-2014/023939 and WO-A-2014/023941. The drive system comprises a drive pinion; a motor operable to rotate the drive pinion via a drive path; and a driven gear adapted to be attached to the wheel so as to be capable of rotating the wheel, wherein the drive system has a drive configuration in which the drive pinion is capable of meshing with the driven gear to permit the motor to drive the driven gear via the drive path.

SUMMARY OF THE INVENTION

A first aspect of the invention provides a drive system for rotating a wheel of an aircraft landing gear, the drive system comprising: a drive pinion; a motor operable to rotate the drive pinion via a drive path; a rotary damper in the drive path between the motor and the drive pinion; and a driven gear adapted to be attached to the wheel so as to be capable of rotating the wheel, wherein the drive system has a drive configuration in which the drive pinion is capable of meshing with the driven gear to permit the motor to drive the driven gear via the drive path.

The use of a rotary damper protects the rest of the drive path from vibrations caused by transmission errors between the drive pinion and the driven gear.

Preferably one of the drive pinion and the driven gear comprises a roller gear having a series of rollers arranged to form a ring, each roller being rotatable about a roller axis (typically at a fixed distance from an axis of rotation of the drive pinion or driven gear, respectively), and the other of the drive pinion and the driven gear comprises a sprocket. The use of a rotary damper is particularly beneficial when used in combination with a roller gear in this way, since the roller gear can create particularly high transmission errors.

The rotary damper may comprise an elastomeric damper such as a "cush drive", or a sprung damper as described in GB-A-2398619. However more preferably the rotary damper is a hydraulic rotary damper, typically comprising an input part and an output part, and a damping liquid for hydraulic damping of rotational oscillations between the parts. A hydraulic damper is preferred since it has improved efficiency and stable properties over a wide temperature range.

The rotary damper may only provide a damping function, but more preferably it comprises one or more springs arranged to bias the input part or output part towards a centred position relative to the other part.

The motor may be naturally cooled, or cooled by forced air. However more preferably the drive system further comprises a flow circuit arranged to supply liquid (such as oil or any other viscous liquid) to the motor, and a pump arranged to pump the liquid around the flow circuit so the liquid cools the motor. Preferably the flow circuit is also arranged to supply the liquid to the hydraulic rotary damper, and the pump is arranged to pump the liquid around the flow circuit so the liquid also provides damping liquid for the hydraulic rotary damper.

Typically the drive path further comprises a set of meshed gears provide a desired gearing ratio between the motor and the drive pinion. Optionally the drive system further comprises a flow circuit arranged to supply liquid (such as oil or any other viscous liquid) to the set of meshed gears, and a pump arranged to pump the liquid around the flow circuit so the liquid lubricates the set of meshed gears. Preferably the flow circuit is also arranged to supply the liquid to the hydraulic rotary damper and/or the motor, and the pump is arranged to pump the liquid around the flow circuit so the liquid also provides damping liquid for the hydraulic rotary damper and/or cools the motor.

Typically the drive path further comprises one or more hydrostatic bearings, and the drive system further comprises a flow circuit arranged to supply liquid (such as oil or any other viscous liquid) to the hydrostatic bearing(s), and a pump arranged to pump the liquid around the flow circuit so the liquid lubricates the hydrostatic bearing(s). Preferably the flow circuit is also arranged to supply the liquid to the hydraulic rotary damper and/or the set of meshed gears and/or the motor, and the pump is arranged to pump the liquid around the flow circuit so the liquid provides damping liquid for the hydraulic rotary damper and/or lubricates the meshed gears and/or cools the motor.

As described above, the flow circuit may omit one or more of the motor, the set of meshed gears, the hydrostatic bearing(s) and the hydraulic rotary damper. However in a preferred embodiment the flow circuit is arranged to supply liquid to the motor, the set of meshed gears, the hydrostatic bearing(s) and the hydraulic rotary damper, and the pump is arranged to pump the liquid around the flow circuit so the liquid cools the motor, lubricates the bearing(s) and the set of meshed gears, and also provides damping liquid for the hydraulic rotary damper.

Optionally the flow circuit comprises a heat exchanger arranged to remove heat from the liquid.

Optionally the flow circuit comprises a filter arranged to filter the liquid.

Optionally the rotary damper comprises an input part and an output part, one of the parts having a cantilevered resilient finger, a free end of which frictionally engages a cam surface on the other part via a frictional interface thereby to provide resilient resistance to relative rotation of the part in either direction from a minimum energy position, with damping of rotational oscillations between the parts. Optionally one of the parts has one or more channels for feeding damping liquid into the frictional interface, the channel(s) forming part of the flow circuit.

The drive pinion may be permanently meshed with the driven gear, but more typically the drive system is switchable between the drive configuration and a neutral configuration in which the drive pinion is not capable of meshing with the driven gear.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
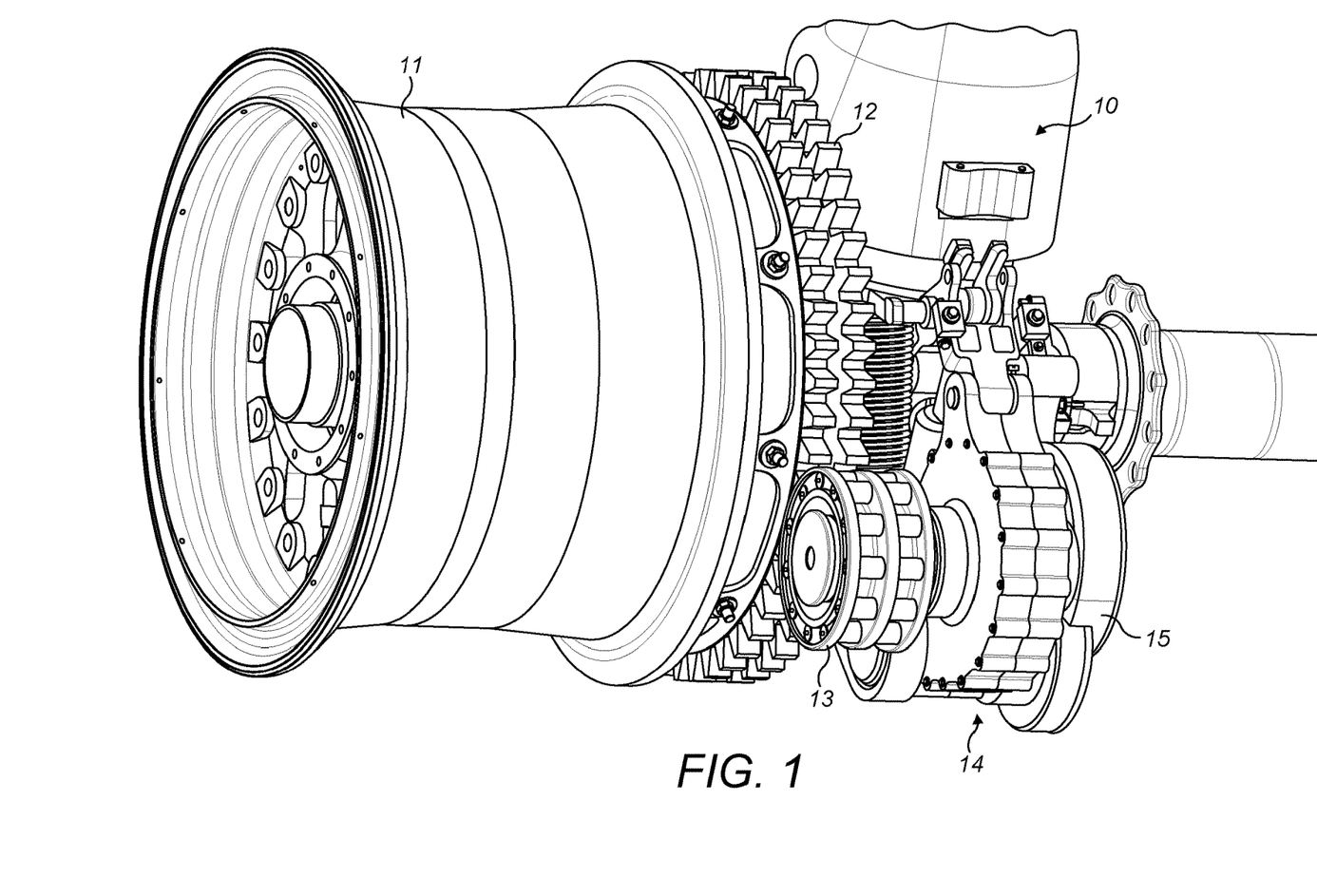
FIG. 1 shows an aircraft landing gear incorporating a drive system according to an embodiment to the present invention.

FIG. 1 shows an aircraft landing gear 10 comprising a wheel 11. A drive system for rotating the wheel 11 comprises a drive pinion 13; a motor 15 operable to rotate the drive pinion 13 via a drive path 14; and a driven gear 12 attached to the wheel so as to be capable of rotating the wheel. The drive system has a drive configuration shown in FIG. 1 in which the drive pinion meshes with the driven gear to permit the motor to drive the driven gear via the drive path.

The drive pinion 13 comprises a roller gear having a series of rollers 22 arranged to form a ring, each roller being rotatable about a roller axis at a fixed distance from an axis of rotation. The driven gear 12 comprises a sprocket. In another embodiment, the rollers may be provided on the driven gear, and the pinion gear comprises a sprocket. A variety of suitable rollers gears are described in WO-A-2014/023939 and WO-A-2014/023941, the contents of which are incorporated herein by reference.

The drive pinion 13 is switchable between the drive configuration of FIG. 1 and a neutral configuration in which the drive pinion is not capable of meshing with the driven gear. WO-A-2014/023939 and WO-A-2014/023941 describe various methods of switching between the drive configuration and the neutral configuration.

Figure 3:
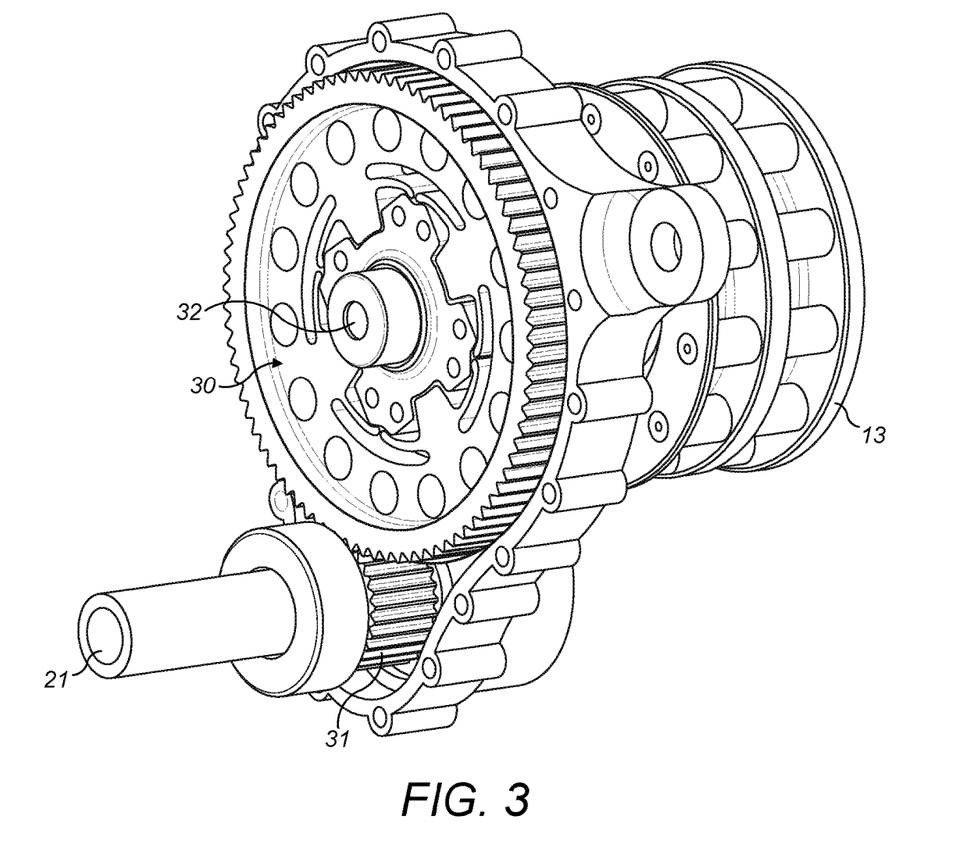
FIG. 3 shows the part of FIG. 2 with part of the gearbox casing removed to show the rotary damper.

The drive path 14 comprises a set of meshed gears, the penultimate gear in the set being a gear 31 shown in FIG. 3 on a shaft 21. The set of gears provide a desired gearing ratio between an output shaft (not shown) of the motor 15 and the shaft 21.

Figure 2:
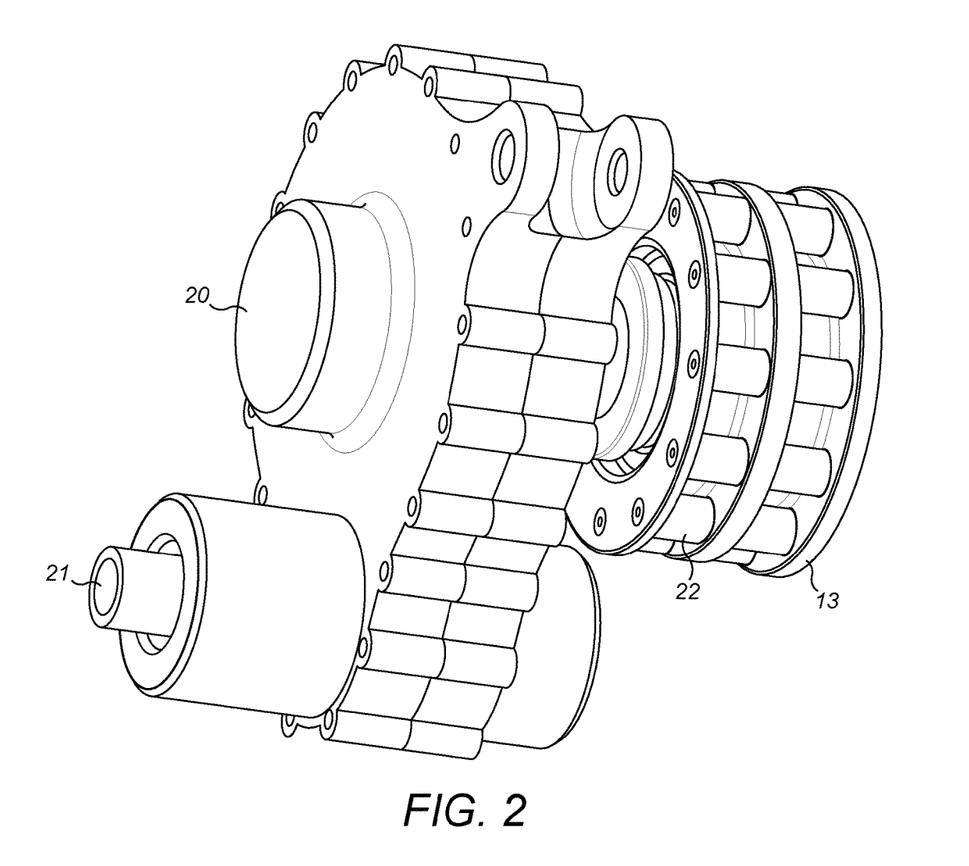
FIG. 2 shows part of the drive system.

The final element in the drive path 14 is a rotary damper 30 shown in FIGS. 3-6. The damper 30 is mounted in a casing 20 which is shown in FIG. 2 and removed in FIG. 3.

Figure 4:
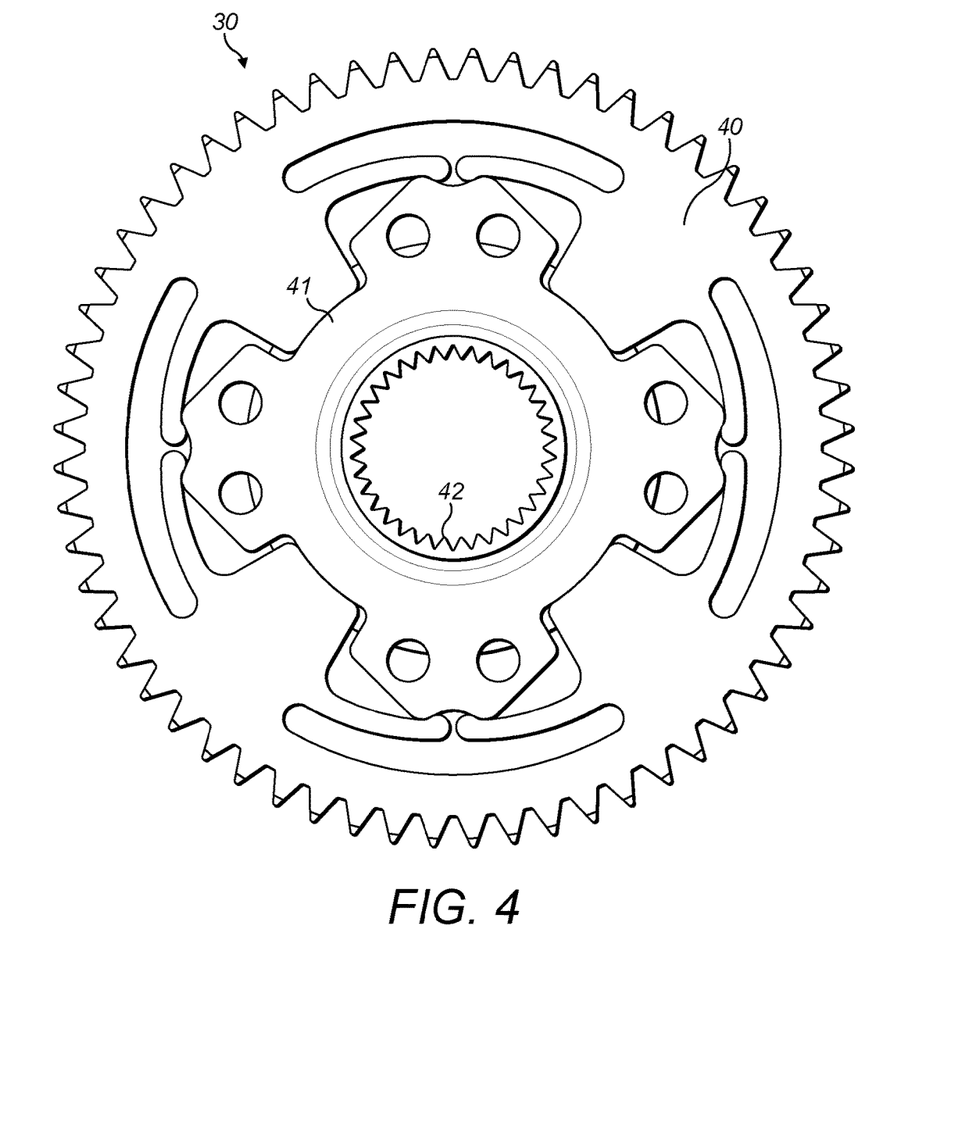
FIG. 4 shows the rotary damper.

The rotary damper 30 comprises an input part 40 and an output part 41 shown in FIG. 4. The input part 40 has four pairs of cantilevered resilient fingers 50 (FIG. 5), a free end of which frictionally engages a cam surface 60 (FIG. 6) on the other part via a frictional interface. When the input part 40 rotates relative to the output part 41 (or vice versa), a stop surface 60 on the input part prevents any further rotation as shown in FIG. 6.

Figure 5:
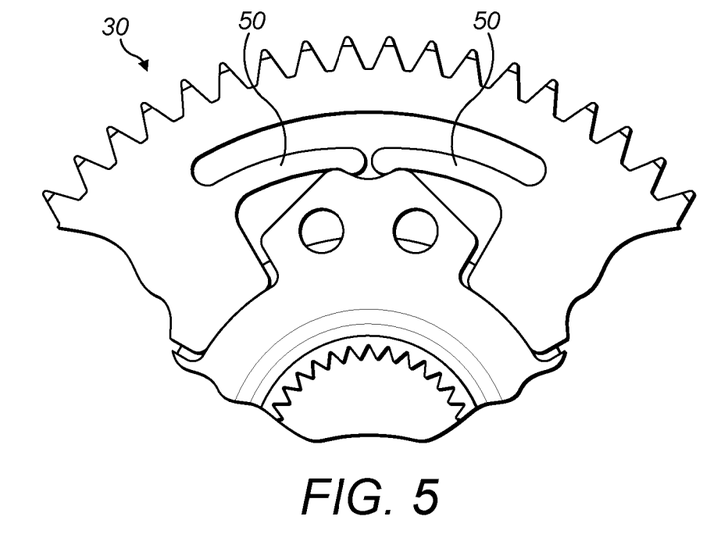
FIG. 5 is an enlarged view of part of the rotary damper in a centred position.
Figure 6:
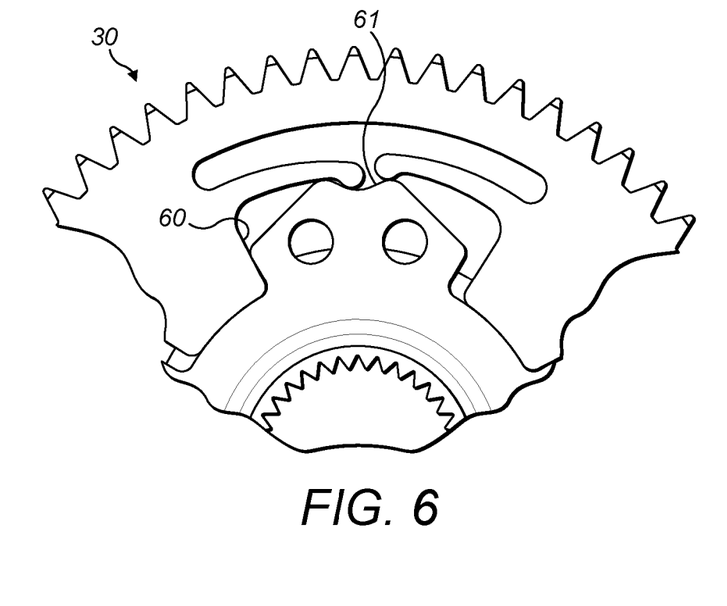
FIG. 6 is an enlarged view of part of the rotary damper in an off-centre position.

The frictional interface provides resilient resistance to relative rotation of the parts in either direction from a centred minimum energy position shown in FIGS. 4 and 5, with damping of rotational oscillations between the parts. The resilient fingers 50 provide not only a damping function, but they also bias the parts towards the centred minimum energy position shown in FIGS. 4 and 5.

Further details of the sprung damper 30 are described in GB-A-2398619, the contents of which are incorporated herein by reference.

The input part 40 has external teeth which engage with external teeth on the gear 31 as shown in FIG. 3. Thus the input part 40 and the gear 31 provide the final pair of meshing gears in the drive path. The output part 41 has internal teeth 42 which are coupled to a pinion drive shaft 32 (shown in FIG. 3) by a spline joint. Thus torque is transmitted from the gear 31 to the pinion 13 via the input part 40, output part 41 and pinion drive shaft 32.

When the pinion 13 is rotated, the rollers at its circumference are brought into contact with the teeth in the driven gear 12. The transmission from the pinion rollers to the driven gear is not smooth, but is instead subject to undesirable cyclical variations in both torque and speed which are one or two orders of magnitude higher than the equivalent variations for a spur gear. This transmission error, if fed back into the drive path 14 and landing gear, may lead to undesirable vibration in the drive path 14 and landing gear. The rotary damper 30 has the effect of reducing the transmission of such vibration into the rest of the drive path or the landing gear. Preferably the rotary damper 30 is the last element in the drive path 14 before the pinion 13 (so all other elements of the drive path are isolated from vibration originating at the pinion) although it may be positioned in other places in the drive path if necessary.

Figure 7:
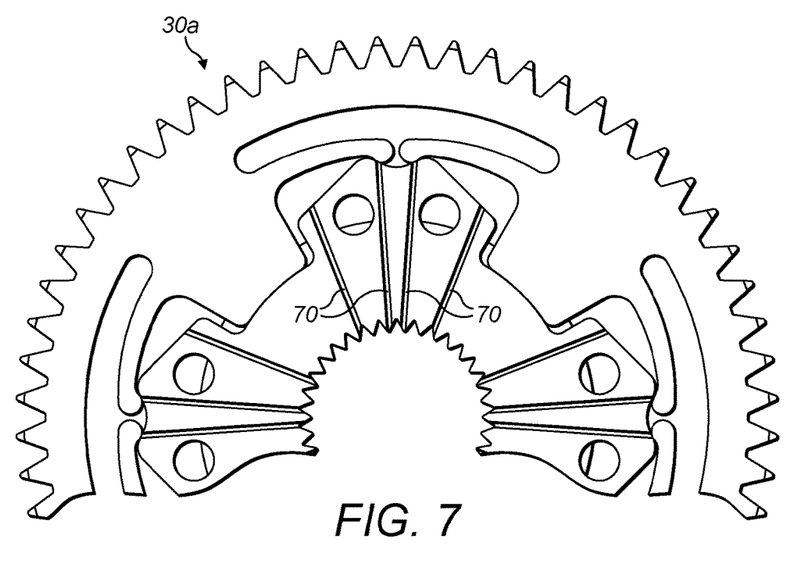
FIG. 7 is an enlarged view of part of a hydraulic rotary damper in a centred position.
Figure 8:
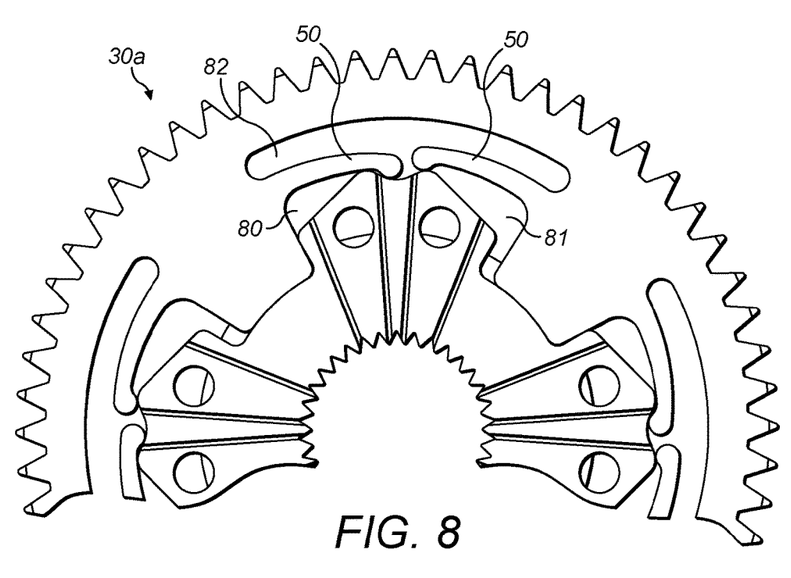
FIG. 8 is an enlarged view of part of the hydraulic rotary damper in an off-centre position.

FIGS. 7 and 8 illustrate an alternative to the frictional rotary damper 30. The rotary damper 30a shown in FIGS. 7 and 8 is identical to the rotary damper 30, except the output part is provided with ducts or channels 70 for feeding oil or any other damping liquid into chambers 80, 81 on either side of the cam surface. As one of the parts rotates to the position of FIG. 8, the left-hand chamber 80 reduces in volume and the damping liquid is forced through the frictional interface between the fingers and the cam surface, and into an outer chamber 82. This provides an enhanced viscous damping effect and a cooling effect. Cover plates (not shown) are provided to seal the damping liquid within the chambers 80-82, and non-return valves (not shown) may also be provided at the outlets of the channels 70.

As mentioned above, a viscous damping effect is provided by the flow of oil through the frictional interface between the fingers 50 and the cam surface 61. Further viscous damping may be provided in a number of ways. One option would be to modify the channels 70 so that one channel into each chamber 80, 81 is an input channel with a non-return valve, and the other channel from each chamber 80, 82 is an output channel with a narrow orifice through which the oil is forced as one of the parts rotates to give a damping effect. Another option would be to provide orifices or other intentional leakage paths in the cover plates, the oil being forced out of the intentional leakage paths as one of the parts rotates to give a damping effect.

Figure 9:
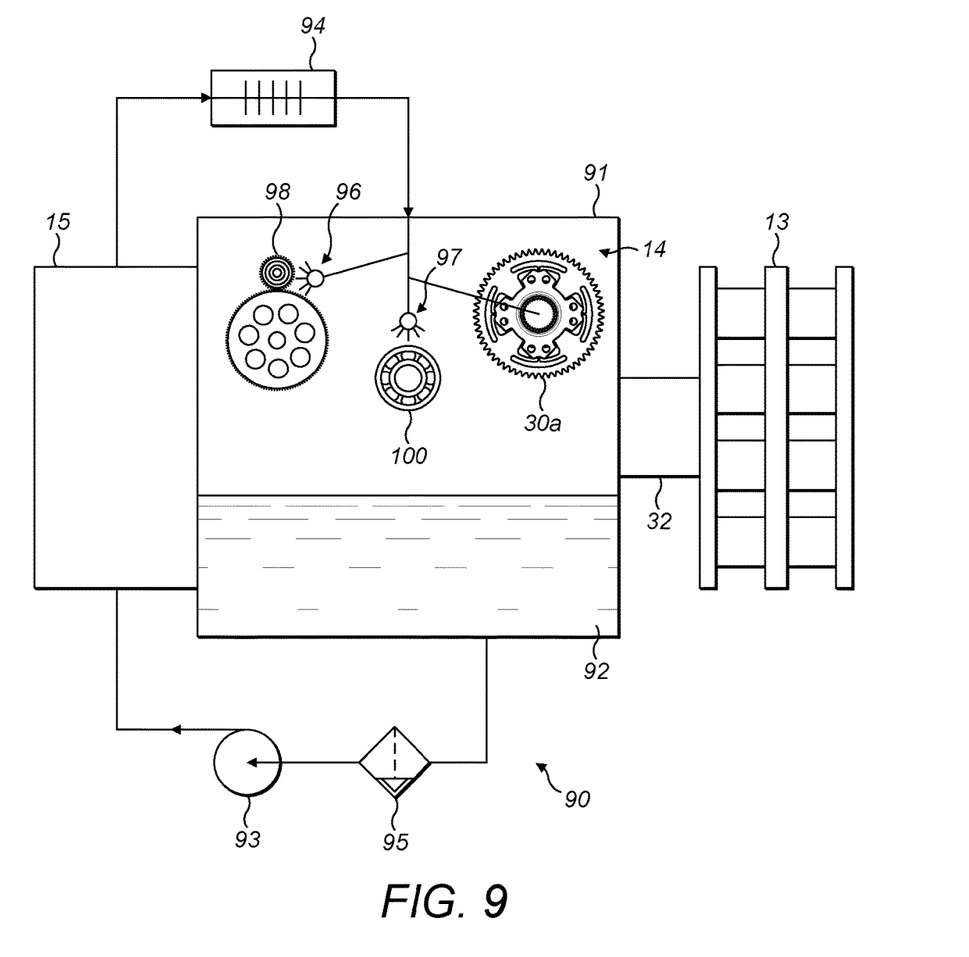
FIG. 9 is a schematic diagram of a pressurised lubrication flow circuit.

A pressurised lubrication flow circuit 90 shown in FIG. 9 is arranged to supplying lubrication liquid (typically an oil) to the motor 15 and a gearbox 91 containing the various components of the drive path 14. A pump 93 is arranged to pump lubrication liquid around the lubrication flow circuit 90. The pump 93 can be electrically driven, or mechanically driven via the drive path. The flow circuit includes a heat exchanger 94 and a filter 95. The heat exchanger 94 may be in the form of cooling fins in the case of the gearbox 91. The filter 95 removes contaminants from the oil such as metal particles or dirt.

The drive path 14 within the gearbox 91 comprises a set of gears including meshing gears 98, 99 shown in FIG. 9 and gear 31 shown in FIG. 3. The pressurised oil in the flow circuit 90 provides jets 96 which lubricate the meshing teeth of the gears 98, 99, 31. The final component in the drive path 14 is the hydraulic rotary damper 30a, and oil in the flow circuit 90 is also fed into the hydraulic rotary damper 30a via the channels 70 shown in FIG. 7.

The drive path 14 within the gearbox 91 also comprises bearings, one being indicated schematically at 100 in FIG. 9, which are lubricated by jets 97 of pressurised oil. Optionally the bearings 100 may be hydrostatic bearings (a bush and a film of oil) lubricated by the pressurized oil in the flow circuit 90, rather than bulkier/heavier ball or roller bearings. The use of hydrostatic bearings is particularly beneficial because the pinion 13 is cantilevered/overhung, resulting in high bearing loads requiring large bearings.

The use of a pressurised or forced lubrication circuit 90 with a pump 93 ensures that all of the meshing gears in the drive path are well lubricated, not just those which are bathed in the oil bath 92.

The oil not only cools the motor and lubricates the meshing gears and bearing(s) in the drive path (to reduce wear and improve mechanical efficiency), but also provides damping liquid for the hydraulic rotary damper 30a. The oil also cools the bearing(s), the meshing gears and the rotary damper, heat being removed from the circuit by the heat exchanger 94.

The motor 15 may be a radial flux electric motor or an axial flux electric motor. The temperature of the motor 15 must be carefully managed to avoid irreversible damage—this is particularly important where permanent rotor magnets are used since excessive temperature may permanently de-magnetize the rotor magnets. In uncooled motors this is achieved by increasing the mass of the motor to provide a heat sink. Thus the cooling effect of the forced oil enables the size of the motor 15 to be reduced, which is particularly important in the context of a landing gear drive system in which all parts must be small and light.

Sharing the motor oil with the gearbox oil increases the volume of oil into which heat can be dissipated—the oil bath 92 (and optionally a further oil reservoir) further increasing the capacity of the system to dissipate heat.

In another embodiment of the invention, the rotary damper 30, 30a may be replaced by a rotary hydraulic damper of the type described in U.S. Pat. No. 4,411,341, or a non-hydraulic rotary damper of the kind described in U.S. Pat. No. 4,947,707. If a rotary hydraulic damper of the type described in U.S. Pat. No. 4,411,341 is used, then hydraulic liquid can be shared with the motor and gearbox as shown in FIG. 9.

Although the invention has been described above with reference to one or more preferred embodiments, it will be appreciated that various changes or modifications may be made without departing from the scope of the invention as defined in the appended claims.

The invention claimed is:

1. A drive system for rotating a wheel of an aircraft landing gear, the drive system comprising: a drive pinion; a motor operable to rotate the drive pinion via a drive path; a rotary damper in the drive path between the motor and the drive pinion; and a driven gear adapted to be attached to the wheel so as to be capable of rotating the wheel, wherein the drive system has a drive configuration in which the drive pinion is capable of meshing with the driven gear to permit the motor to drive the driven gear via the drive path.

2. A drive system according to claim 1, wherein one of the drive pinion and the driven gear comprises a roller gear having a series of rollers arranged to form a ring, each roller being rotatable about a roller axis, and the other of the drive pinion and the driven gear comprises a sprocket.

3. A drive system according to claim 1, wherein the rotary damper is a hydraulic rotary damper.

4. A drive system according to claim 3, wherein the hydraulic rotary damper comprises an input part and an output part, and a damping liquid for hydraulic damping of rotational oscillations between the parts.

5. A drive system according to claim 4, wherein the rotary damper comprises one or more springs arranged to bias the input part or output part towards a centred position relative to the other part.

6. A drive system according to claim 3, further comprising a flow circuit arranged to supply liquid to the motor and the hydraulic rotary damper; and a pump arranged to pump the liquid around the flow circuit so the liquid cools the motor and provides damping liquid for the hydraulic rotary damper.

7. A drive system according to claim 6 wherein the drive path further comprises a set of meshed gears provide a desired gearing ratio between the motor and the drive pinion, the flow circuit is arranged to supply the liquid to the set of meshed gears, and the pump is arranged to pump the liquid around the flow circuit so the liquid lubricates the set of meshed gears.

8. A drive system according to claim 6, wherein the flow circuit comprises a heat exchanger arranged to remove heat from the liquid.

9. A drive system according to claim 6, wherein the flow circuit comprises a filter arranged to filter the liquid.

10. A drive system according to claim 9, wherein the rotary damper comprises an input part and an output part, one of the parts having a cantilevered resilient finger, a free end of which frictionally engages a cam surface on the other part via a frictional interface thereby to provide resilient resistance to relative rotation of the part in either direction from a minimum energy position, with damping of rotational oscillations between the parts.

11. A drive system according to claim 10, wherein one of the parts has one or more channels for feeding damping liquid into the frictional interface.

12. A drive system according to claim 11, wherein the one or more channels form part of the flow circuit.

13. A drive system according to claim 3, wherein the drive path further comprises a set of meshed gears provide a desired gearing ratio between the motor and the drive pinion; and the drive system further comprises a flow circuit arranged to supply liquid to the set of meshed gears and the hydraulic rotary damper, and a pump arranged to pump the liquid around the flow circuit so the liquid lubricates the set of meshed gears and provides damping liquid for the hydraulic rotary damper.

14. A drive system according to claim 3, wherein the drive path further comprises one or more hydrostatic bearings, and the drive system further comprises a flow circuit arranged to supply liquid to the hydrostatic bearing(s) and the hydraulic rotary damper, and a pump arranged to pump the liquid around the flow circuit so the liquid lubricates the hydrostatic bearing(s) and provides damping liquid for the hydraulic rotary damper.

15. A drive system according to claim 1, wherein the drive system is switchable between the drive configuration and a neutral configuration in which the drive pinion is not capable of meshing with the driven gear.

16. An aircraft landing gear comprising a wheel and a drive system according to claim 1, wherein the driven gear of the drive system is attached to the wheel so as to be capable of rotating the wheel.

\* \* \* \* \*